United States Patent
Koopman, Jr. et al.

[11] Patent Number: 5,991,673
[45] Date of Patent: Nov. 23, 1999

[54] VEHICLE ANTI-THEFT SYSTEM INCLUDING VEHICLE IDENTIFICATION NUMBERS PROGRAMMED INTO ON-BOARD COMPUTERS

[75] Inventors: Philip J. Koopman, Jr., Pittsburgh, Pa.; Roger D. Carroll, Burnsville, Minn.

[73] Assignee: Lear Automotive Dearborn, Inc., Southfield, Mich.

[21] Appl. No.: 08/774,945

[22] Filed: Dec. 27, 1996

[51] Int. Cl.⁶ ........................................................ H04L 9/32
[52] U.S. Cl. ............................................... 701/32; 701/29
[58] Field of Search ................... 701/1, 29, 32; 342/357

[56] References Cited

U.S. PATENT DOCUMENTS 5,787,367  7/1998  Berra ............................................. 701/1

*Primary Examiner*—William A. Cuchlinski, Jr.
*Assistant Examiner*—Arthur D. Donnelly
*Attorney, Agent, or Firm*—Brooks & Kushman P.C.

[57] ABSTRACT

A vehicle anti-theft system includes programming vehicle identification numbers or a corresponding identifier value into a read-only memory portion of each computer on board the vehicle. The computers are all linked through a multiplex communication system that has a monitoring port. The monitoring port facilitates coupling an external device to the multiplex communication link. The external monitoring device is used to determine the contents of the read only memory portion on each component to determine whether any of the components were stolen from another vehicle, for example.

21 Claims, 1 Drawing Sheet

VEHICLE ANTI-THEFT SYSTEM INCLUDING VEHICLE IDENTIFICATION NUMBERS PROGRAMMED INTO ON-BOARD COMPUTERS

BACKGROUND OF THE INVENTION

This invention generally relates to an anti-theft system for vehicles. More particularly, this invention relates to a system for inhibiting or preventing the theft of vehicle components by including a unique vehicle identifier on each component.

Vehicle theft is a substantial, widespread problem. Most often, when a vehicle is stolen it is dismantled into component parts, which are sold individually. An additional problem is that certain vehicle components, such as air-bags and stereos, are stolen from vehicles and later sold.

One attempt to reduce the ability to sell stolen vehicles and component parts has been to physically or mechanically etch a vehicle identification number onto certain portions of a vehicle. This approach has several shortcomings and drawbacks. First, physically etching in an identification number to a plurality of component parts typically proves prohibitively expensive. Further, physical etching is relatively easy for a thief to detect and, in many circumstances, alter. Moreover, there is no efficient way to verify that a particular component on a vehicle has a legitimate identification number without visually inspecting it, which may require removing that part from the vehicle. This makes the task of monitoring stolen parts prohibitively expensive.

This invention overcomes many of the short-fallings and drawbacks of the prior art. This invention provides an efficient method and system for identifying component parts of a vehicle. Moreover, a system designed according to this invention provides for easy monitoring for detecting stolen parts. Further, this invention includes a strategy for prohibiting a thief from altering an identification given to a component part, which discourages theft because it reduces the ability to sell a stolen part.

SUMMARY OF THE INVENTION

In general terms this invention is a vehicle security system for preventing or deterring the theft of vehicles and component parts that includes placing a vehicle identifier into a memory portion of each computer on board the vehicle. The system includes a multiplex communication link. A plurality of vehicle components each have a computer. The computers are coupled to the multiplex communication link. Each computer has a memory portion that includes a vehicle identifier that corresponds to a vehicle identification number of the vehicle. The multiplex communication link includes a monitoring port that is accessible from outside the vehicle. An interface device is connected to the monitoring port and used to access the computers that are connected to the communication link so that the vehicle identifier on each component part can be read.

The method of this invention includes three basic steps. First, a vehicle identification number is assigned to the vehicle. Second, a vehicle identifier that corresponds to the vehicle identification number is generated. Lastly, the vehicle identifier is stored in a read-only memory portion of each component part that includes a computer. The computer memories can later be accessed to determine whether a component part is on an appropriate vehicle.

The various features and advantages of this invention will become apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
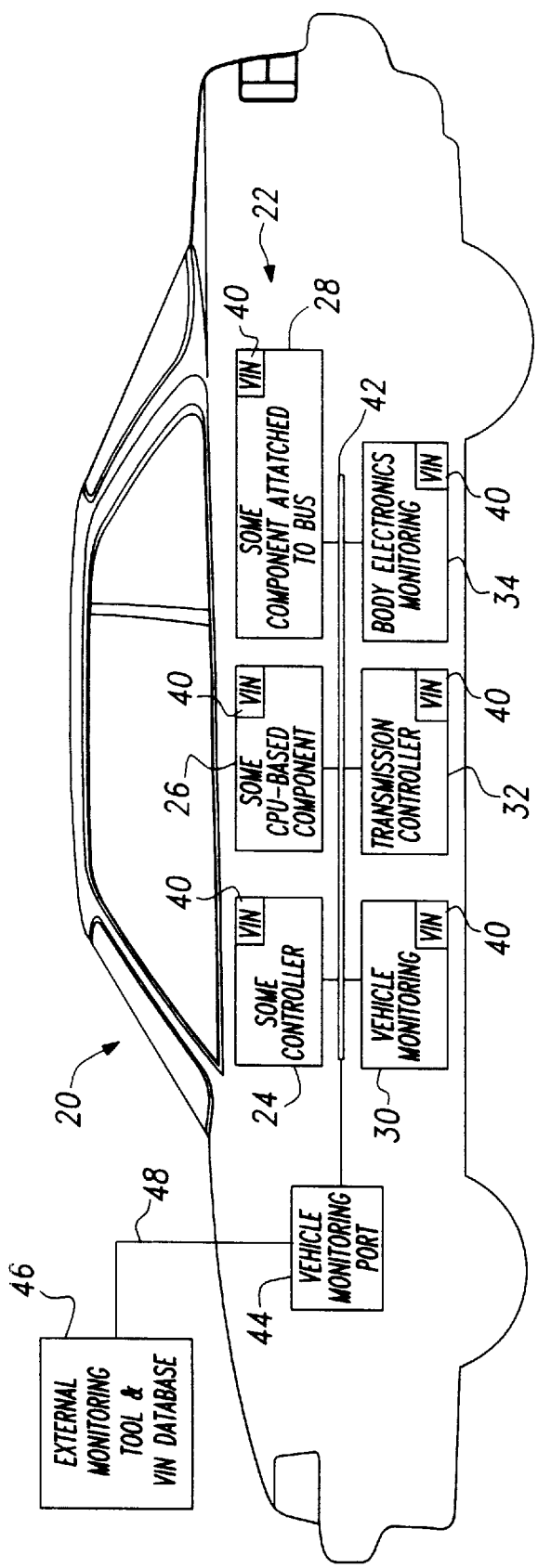
FIG. 1 is a schematic illustration of an anti-theft system designed according to this invention.

FIG. 1 schematically illustrates a vehicle 20 that includes an anti-theft system 22. A plurality of vehicle component parts 24 through 34 either comprise a computer or include a computer. Each of the component part computers includes a read only memory portion 40 that is programmed to include a vehicle identification number associated with the vehicle 20 or an identifier corresponding to the vehicle identification number.

The computer of each component part is coupled to a multiplex bus line 42, which can be any conventional multiplex communication link. Examples of suitable multiplexed communication links include the known SAE J-1850 protocol and the CAN protocol. A vehicle monitoring port 44 is also coupled to the multiplex communication link 42. An external monitoring device 46 is used to communicate through the vehicle monitoring port 44 to access the multiplex communication link 42. The external monitoring device 46 preferably includes a visual display for indicating information that is obtained from the various component parts of the vehicle and further preferably includes a data base that facilitates determining whether an identifier programmed into each component part computer memory is valid or appropriate.

The coupling 48 between the monitoring device 46 and the monitoring port 44, schematically illustrated in FIG. 1, can be any conventional hard wiring arrangement or a radio frequency communication arrangement, for example. The external monitoring device facilitates quickly and efficiently determining whether any of the component parts that are connected to the multiplex communication link 42 were inappropriately installed on the vehicle 20.

The read only memory portion 40 preferably is a one-time programmable read only memory. In the presently preferred embodiment, the memory portion 40 includes metal fuses that are blown with a high voltage. The memory portion 40 is only programmable so long as the corresponding metal fuse or fuses is not blown. Accordingly, once the memory portion 40 is appropriately programmed, the appropriate fuse or fuses is blown to prevent alteration of or tampering with the contents of the memory portion 40. Accordingly, the memory portion 40 is a non-volatile, tamper-resistant memory that stores an identifier corresponding to a vehicle identification number, which is either impossible or very difficult to alter.

In the presently preferred embodiment, all component parts are manufactured with a blank or empty memory portion 40. The vehicle identification number value preferably is programmed into the component parts at the end of an assembly line. This can be accomplished because each of the computers are connected to the multiplex communication link 42 and, therefore, can be accessed through the vehicle monitoring port 44. Programming in the vehicle identification number values at the end of the vehicle assembly process provides the advantage of eliminating a need for coordinating parts to vehicles during assembly procedures.

Legitimately manufactured replacement component parts preferably initially have a blank memory portion 40. This memory portion can remain blank or be programmed with a vehicle identification number after that component part is installed on a vehicle.

A system designed according to this invention has many advantages and potential uses. For example, an insurance company representative could use an external monitoring device 46 to test and determine whether replacement parts used at a repair shop are authentic, dealer-approved component parts. Similarly, a vehicle identification number value data base provides the ability to determine whether replacement parts that were used were stolen from another vehicle. Those skilled in the art will realize other advantages and applications for a system designed according to this invention.

Although vehicle identification numbers provide an exact way to match up a component part with an appropriate vehicle, in many circumstances it is useful to program a separate vehicle identifier into the memory portions 40. Current vehicle identification number format includes seventeen alphanumeric characters. This provides $1.7 \times 10^{24}$ possible combinations. 81 bits of computer memory are required where a full 17 character identification number is implemented. Providing that much memory in the memory portion 40 may prove prohibitively expensive in certain circumstances. Accordingly, this invention includes a method of encoding a vehicle identification number that salves memory and, therefore, reduces the costs associated with a system for implementing this invention.

Figure 2:
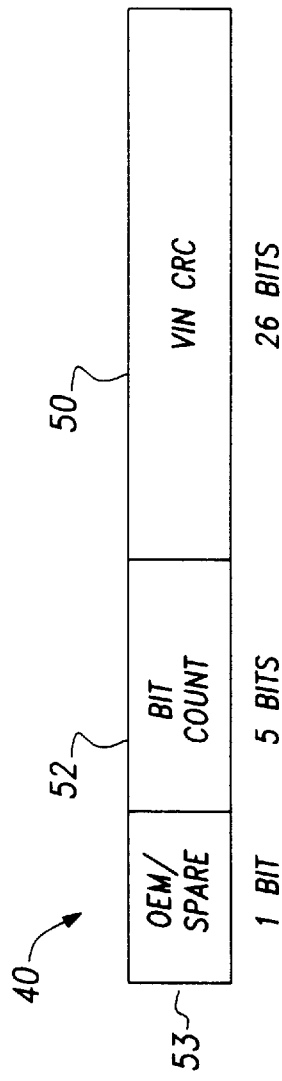
FIG. 2 is a schematic illustration of a read only memory portion of a component part computer designed according to this invention.

FIG. 2 schematically illustrates a preferred example of the read only memory portion 40. The memory portion 40 is divided into three sections, a first section 50, a second section 52 and a third section 53. In the preferred embodiment, the first section 50 includes 26 bits. A vehicle identifier preferably is stored in the first section 50. The vehicle identifier is generated using a cyclic redundancy code or other conventional hash function value. The vehicle identifier has a direct correspondence to the vehicle identification number assigned to the vehicle at the time of manufacture. Providing a twenty-six bit identifier that corresponds to a vehicle identification number appears to be sufficient to avoid having more than one vehicle identification number correspond to the same vehicle identifier. Having twenty-six bits available for the vehicle identifier, assuming that the cyclic redundancy code function provides a uniform hash distribution of vehicle identification numbers, results in a one in 67 million chance of a vehicle identifier corresponding to an inappropriate vehicle identification number. Embodiments where greater odds of an accidental match are required may include more than twenty-six bits of memory in the first memory section 50.

The memory portion 40 is made tamper-proof by utilizing read only memory. As mentioned above, one-time programmable read only memory is preferred. One time programmable read only memory initially begins with all bits set at one polarity (typically either positive or negative). As the vehicle identifier is programmed into the first memory section 50, the polarity of certain bits is altered. In one example, the first memory section 50 includes all bits having a 1 (positive) value. As the vehicle identifier is programmed into the first section 50, certain of the bits are blown or changed to a 0 (negative) value. The number of bits with a changed polarity is programmed into the second memory section 52 after the first section has been programmed.

The second memory section 52 preferably includes five bits that are utilized to indicate the number of bits in the first section 50 having a chosen polarity after the vehicle identifier has been programmed. The combination of the first section 50 and the second section 52 provides an indicator of tampering of the memory portion 40. The vehicle identifier in the first section 50 can only be altered by changing the polarity of one or more bits within the first section 50. This would increase the number of bits having a changed polarity, which would no longer match the number indicated in the second section 52.

The second section 52 preferably begins with the five bits having an opposite polarity from the initial polarity of the bits within the first section 50 to provide enhanced tamper-resistant characteristics. Under these circumstances, if someone altered the contents of the first section 50 without altering the contents of the second section 52, tampering would be evident. Further, if one attempted to alter the contents of both sections, tampering is still evident. Blowing additional bits in the first section 50 would result in more negative polarity bits, for example. While blowing additional bits in the second section 52 would result in less negative polarity bits. Accordingly, any alteration of the first section 50 or the second section 52 indicates that the contents of the memory portion have been tampered.

In the illustrated embodiment, the memory portion 40 includes a third section 53. The third section 53 preferably includes one bit that is left unaltered on original equipment and blown for replacement equipment. This third section, therefore, provides a convenient way of indicating originally installed equipment or authorized replacement parts.

In another example, the memory portion 40 includes the vehicle identifier and a fuse that is blown to inhibit further writing to the read only memory portion. Since this capability may not be available on microcontrollers that are included in many vehicle component parts, the cyclic redundancy code approach that is described above likely has more widespread usefulness.

Another example includes having a single original-replacement bit that initially has a 1 (positive) value. When a component part is installed as original equipment, the single bit is blown or given a 0 (negative) value. Therefore, the single bit represents a proof of purchase for legitimate replacement parts that would be absent from any component part taken from a stolen or junked vehicle. The latter embodiment is most useful to insurance companies that desire to deter the theft of component parts and would only accept new component parts during authorized vehicle repair, for example.

Coupling all of the memory portions 40 to the communication link 42 and providing the vehicle monitoring port 44 provides authorized individuals or agencies with the ability to quickly, efficiently and accurately determine whether any component parts on a particular vehicle are stolen or were inappropriately installed depending on the circumstances.

The preceding description is exemplary rather than limiting in nature. Variations and modifications to the disclosed embodiment may become apparent to those skilled in the art that do not necessarily depart from the purview and spirit of this invention. Accordingly, the following claims must be studied to determine the scope of legal protection afforded this invention.

What is claimed is:

1. A vehicle security system, comprising:

a multiplex communication link;

a plurality of components, each having a computer coupled to said multiplex communication link, each said computer having a memory portion that includes a vehicle identifier that corresponds to a vehicle identification number of the vehicle, each said vehicle identifier being identical; and a monitoring port, accessible from outside the vehicle and coupled to said multiplex communication link.

2. The system of claim 1, further comprising an interface device adapted to be coupled to said monitoring port and having a memory reading portion so that each said vehicle identifier can be read from each said computer memory portion.

3. The system of claim 1, wherein each said computer memory portion comprises a one time programmable read only memory having a blocking element that blocks manipulation or destruction of said vehicle identifier once said identifier is programmed into said memory.

4. The system of claim 3, wherein said blocking element comprises a fuse that is adapted to be blown after said vehicle identifier is programmed into said memory portion.

5. The system of claim 1, wherein each said memory portion comprises a first and second module, said first modules each including a plurality of bits that each have a first or second polarity, said first module containing said vehicle identifier wherein a number of bits having said first polarity corresponds to said identifier, said second module containing information corresponding to said number of bits having said first polarity.

6. The system of claim 5, wherein each said memory portion further comprises a third module including an installation identifier that identifies whether said component was installed by a vehicle manufacturer or by some other source.

7. The system of claim 5, wherein each said second module includes a plurality of bits each having said first or second polarity, a number of said second module bits having said first polarity corresponds to said number of first module bits having said first polarity and wherein said first and second modules are interrelated such that an increase in said number of first module bits having said first polarity is consistent with a decrease in said number of second module bits having said first polarity.

8. A vehicle security system, comprising:

a multiplex communication link;

a plurality of components, each having a computer coupled to said communication link, each said computer having a memory portion that includes a source identifier that corresponds to a source of each said component and indicates whether each said component source is an original equipment manufacturer; and a monitoring port, accessible from outside the vehicle and coupled to said communication link.

9. The system of claim 8, further comprising an interface device adapted to be coupled to said monitoring port and having a memory reading portion so that each said source identifier can be read from each said computer memory portion.

10. The system of claim 8, wherein each said computer memory portion further includes a vehicle identifier that corresponds to a vehicle identification number associated with the vehicle.

11. A method of deterring theft of vehicle component parts wherein the component parts each include a computer, comprising the steps of:

(A) assigning a vehicle identification number to the vehicle;

(B) generating a vehicle identifier corresponding to the vehicle identification number; and (C) storing the vehicle identifier in a memory portion of the computer included with each component part.

12. The method of claim 11, further comprising the step of comparing the vehicle identifier in the memory portion of each component part computer with the vehicle identifier from step (B) to determine whether any of the component parts have been removed or replaced after step (C) was performed.

13. The method of claim 11, further comprising linking all the computers included in the component parts with a multiplex communication system, accessing the vehicle identifiers stored on the linked computers, and comparing an existing vehicle identifier on each computer with the vehicle identifier from step (B).

14. The method of claim 13, wherein the vehicle identifiers are accessed by coupling a monitoring device that is separate from the vehicle to the communication system and reading the contents of the memory portion of each computer, using the monitoring device.

15. The method of claim 11, wherein step (C) is performed by instigating a blocking element in the memory portion of each computer after the vehicle identifier is stored, wherein the blocking element prevents further alteration of the contents of the memory portion.

16. The method of claim 15, wherein step (C) is performed by blowing a fuse that is associated with the memory portion of each computer after the vehicle identifier is stored, wherein the memory portion cannot be altered after the fuse has been blown.

17. The method of claim 11, wherein step (B) is performed by selecting portions of the vehicle identification number from step (A) in a preselected order.

18. The method of claim 11, wherein step (C) is performed by placing the vehicle identifier in a first section of the memory portion of each computer including a plurality of bits having a first or second polarity, determining a number of bits within the first section having the first polarity, and programming a second section of the memory portion such that it contains an indicator of the number of first section bits having the first polarity.

19. The method of claim 18, further comprising programming a third section of the memory portion to include an indicator of a source of the component part.

20. A vehicle security system, comprising:

a multiplex communication link;

a plurality of components, each having a computer coupled to said multiplex communication link, each said computer having a memory portion that includes a vehicle identifier that corresponds to a vehicle identification number of the vehicle;

each said computer memory portion comprising a one time programmable read only memory having a blocking element that blocks manipulation or destruction of said vehicle identifier once said identifier is programmed into said memory, said blocking element comprising a fuse that is adapted to be blown after said vehicle identifier is programmed into said memory portion; and a monitoring port, accessible from outside the vehicle and coupled to said multiplex communication link.

21. A vehicle security system, comprising:

a multiplex communication link;

a plurality of components, each having a computer coupled to said multiplex communication link, each said computer having a memory portion that includes a vehicle identifier that corresponds to a vehicle identification number of the vehicle;

each said memory portion including a first, second and third module, said first modules each including a plurality of bits that each have a first or second polarity, said first module containing said vehicle identifier wherein a number of bits having said first polarity corresponds to said identifier, said second module containing information corresponding to said number of bits having said first polarity, said third module including an installation identifier that identifies whether said component was installed by a vehicle manufacturer or by some other source;

each said second module including a plurality of bits each having said first or second polarity, a number of said second module bits having said first polarity corresponding to said number of first module bits having said first polarity and wherein said first and second modules are interrelated such that an increase in said number of first module bits having said first polarity is consistent with a decrease in said number of second module bits having said polarity.

* * * * *